United States Patent Office 3,362,453
Patented Jan. 9, 1968

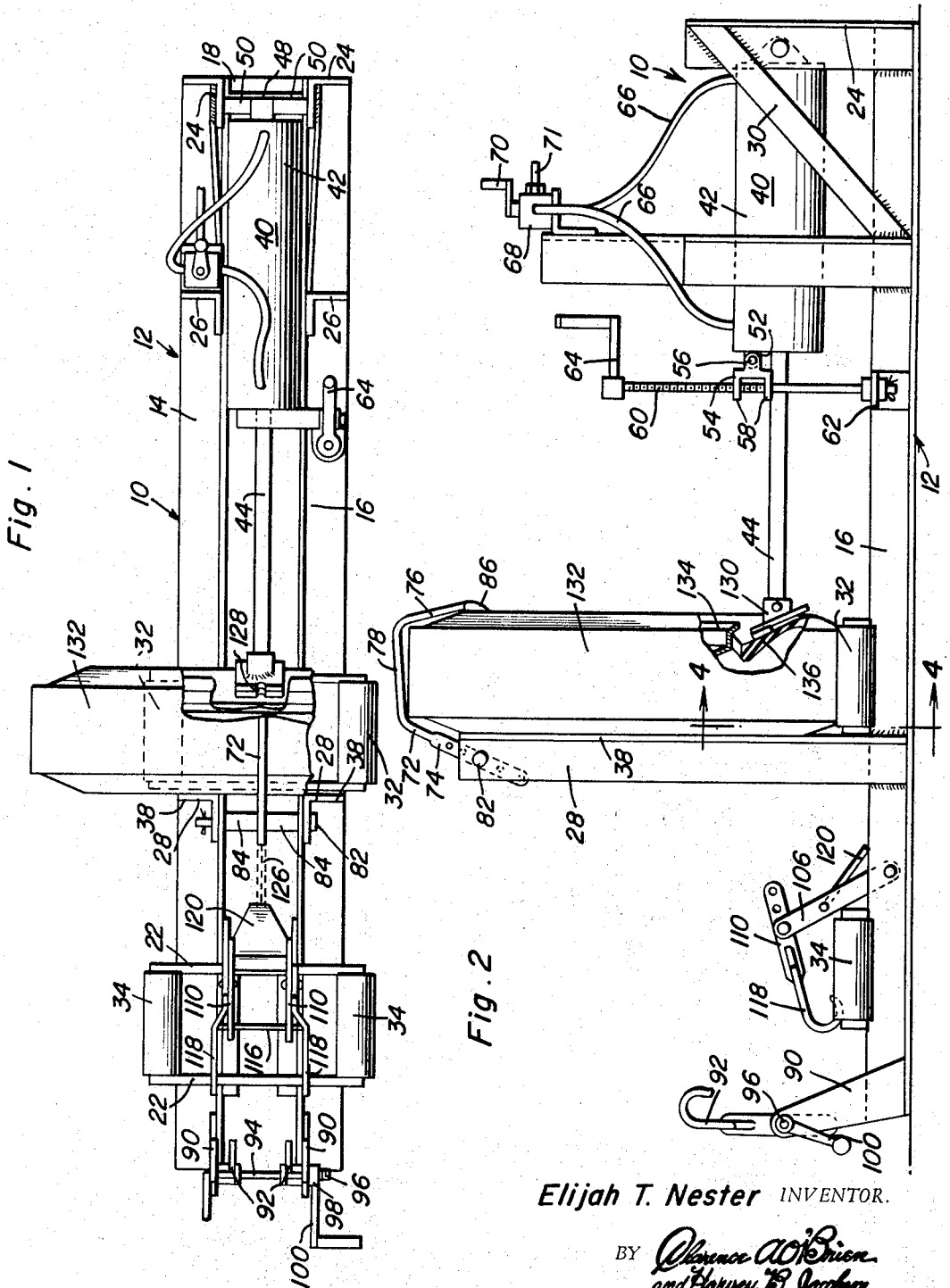

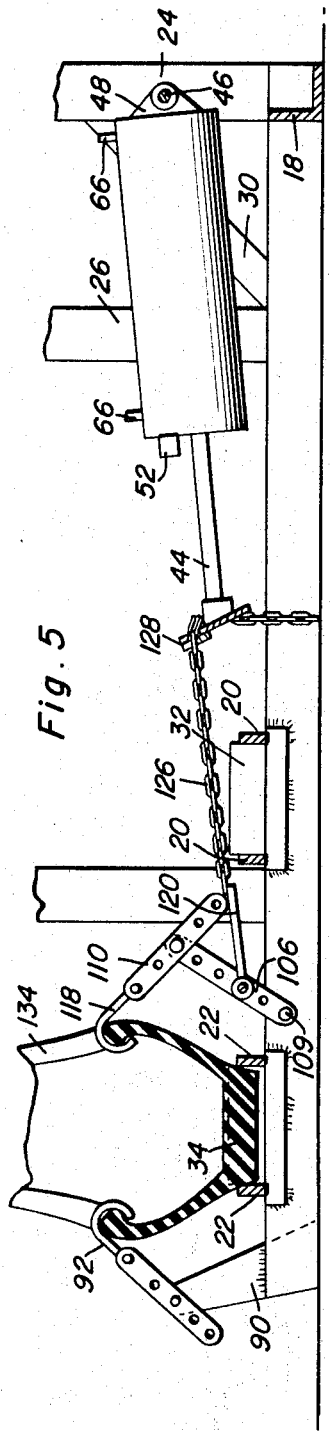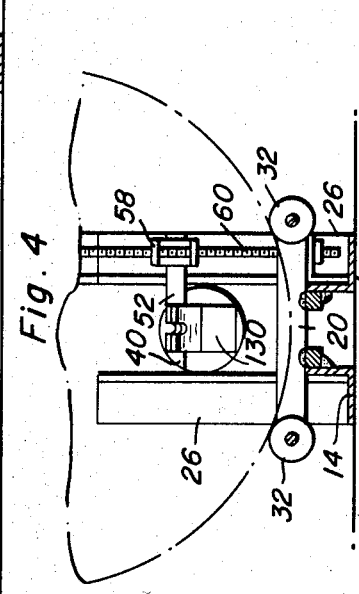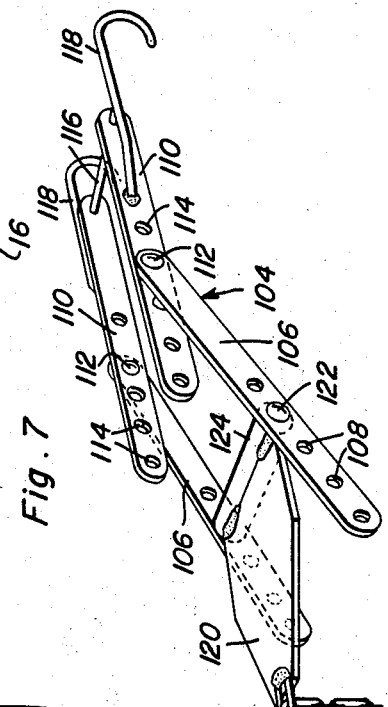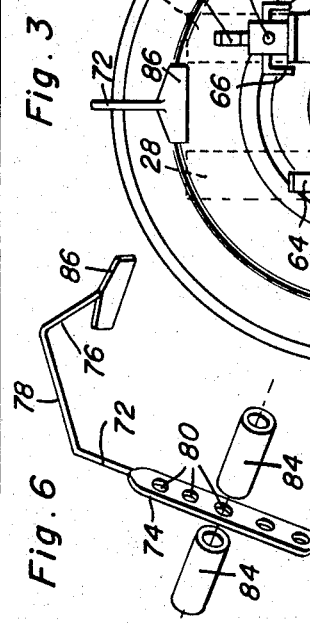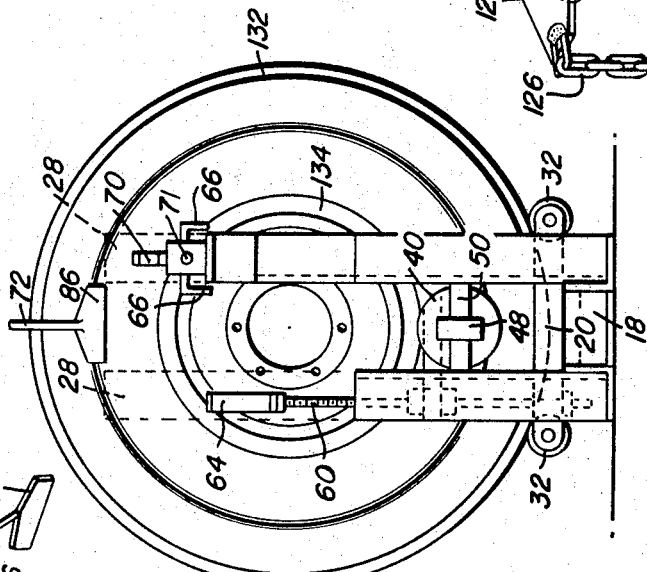

3,362,453
TIRE BREAKER AND SPREADER
Elijah T. Nester, Radford, Va.
(Rte. 1, Box 510–A, Christianburg, Va. 24073)
Filed Sept. 9, 1966, Ser. No. 578,390
12 Claims. (Cl. 157—1.17)

ABSTRACT OF THE DISCLOSURE

A frame including upstanding abutment surface means against which one side of a wheel mounted tire is adapted to abut and including a longitudinally extendible motor having one end portion pivotally supported from the frame for rotation about an axis generally paralleling the abutment surface and the other end portion extending toward the abutment surface with means thereon adapted for engagement with the opposing sidewall portion of a tire disposed alongside the abutment surface, means being provided whereby the angular position of the motor relative to the frame means may be adjusted and releasably maintained.

---

This invention relates to a novel and useful tire bead breaker and spreader and more specifically to an apparatus adapted to support a wheel rim mounted tire and including means operable to inwardly deflect one of the bead portions of the tire so as to "break" the bead portion from the corresponding rim portion of the wheel on which the tire is mounted. In addition, the apparatus of the instant invention further includes means whereby a tire casing supported therefrom may have its bead portions spread apart for inspection of the interior of the casing and also to facilitate repair operations performed on the casing.

The main object of this invention is to provide an apparatus which will be capable of handling various size vehicle wheels and which will be operable to "break" the bead portions of even the largest tire casing from a supporting wheel rim.

Another object of this invention is to provide a tire bead breaker and spreader in accordance with the preceding object and including means by which the apparatus may be readily and quickly adjusted for operation in connection with different size tires.

A final object of this invention to be specifically enumerated herein is to provide a tire bead breaker and spreader which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the tire breaker and spreader with a wheel mounted tire operatively positioned thereon and the tire breaker and spreader positioned to "break" one of the bead portions of the tire from its associated wheel rim, portions of the tire and wheel rim being broken away;

FIGURE 2 is a side elevational view of the assemblage illustrated in FIGURE 1;

FIGURE 3 is an end elevational view of the assemblage illustrated in FIGURE 1 as seen from the right side thereof;

FIGURE 4 is a fragmentary transverse vertical sectional view taken substantially upon the plane indicated by section line 4—4 of FIGURE 2;

FIGURE 5 is a fragmentary longitudinal vertical sectional view of the tire breaker and spreader taken substantially upon a plane passing through the longitudinal center line thereof and illustrating the apparatus spreading the lower bead portions of a tire casing apart for inspection of the interior of the casing;

FIGURE 6 is an exploded perspective view of an upper portion of the tire breaker and spreader which is utilized to retain the tire having its bead portion broken away from the associated rim in an upright position; and FIGURE 7 is a perspective view of a portion of the tire breaker and spreader utilized to spread the bead portions of a tire casing apart.

Referring now more specifically to the drawings the numeral 10 generally designates the machine comprising the tire breaker and spreader of the instant invention. The machine 10 includes a frame generally referred to by the reference numeral 12 having a pair of generally parallel longitudinal side members 14 and 16 interconnected at one end by means of a transverse member 18 and also by two pairs of roller support bars 20 and 22 secured between the other end portions of the members 14 and 16. The members 14, 16 and 18 are angle members and the end of the frame 12 adjacent the member 18 is provided with two pairs of upright angle members 24 and 26 whose lower ends are suitably secured in any convenient manner such as by welding to the corresponding members 14 and 16. The members 24 and 26 are also angle members and a third pair of upright angle members 28 are secured to the members 14 and 16 adjacent the roller support plates 20. Further, the upper and lower ends of the upright angle members 24 and 26 are interconnected by means of suitable diagonal bracing members 30.

The opposite ends of the roller support bars 20 and 22 project outwardly beyond the members 14 and 16 and a pair of rollers 32 are journalled between the opposite end portions of the roller support bars 20 while a pair of rollers 34 are journalled between the opposite ends of the roller support plates 22. As can best be seen from a comparison of FIGURES 2 and 5 of the drawings it may be seen that the rollers 32 as well as the rollers 34 may be utilized to rollingly support a tire casing therefrom for rotation of the latter about its center axis while maintaining that center axis stationarily positioned relative to the machine 10. Further, the upstanding abutment members 28 include flange portions 38 which extend transversely of the machine 10 and which thereby define large area abutment surfaces against which one side face of the tire casing rollingly supported from the rollers 32 may be abutted.

A longitudinally extensible fluid motor 40 is provided and includes a cylinder portion 42 and an extendible piston rod portion 44. The cylinder portion 42 is pivotally supported between the abutment members 24 by means of a pivot shaft 46 supported from the abutment members 24, rotatably received through an apertured mounting lug 48 on the rear end of the cylinder portion 42 and having spacer sleeves 50 disposed thereon intermediate the apertured mounting lug 48 and the angle members 24. The forward end of the cylinder portion 42 through which the piston rod portion 44 extends has an apertured mounting lug 52 mounted thereon to which a bifurcated member 54 is pivotally secured for rotation about a horizontal transverse axis by means of a pivot pin 56. The furcations 58 of the bifurcated member 54 have aligned threaded bores formed therethrough and a screw shaft 60 is threadedly secured through the furcations 58 and has its lower end loosely rotatably journalled in a suitable bracket 62 supported from the members 16. Of course, the screw shaft 60 is maintained against longitudinal displacement relative to the bracket 62 and is provided with a crank handle 64 on its upper end whereby the shaft 60 may be readily rotated to cause vertical adjustment of the front end of the cylinder portion 42. The fluid motor 40 is of the double-acting type and includes fluid inlet and outlet lines 66 operatively communicated with the interior of the opposite ends of the cylinder portion 42 and the ends of the line 66 remote from the fluid motor 40 are operatively connected to a fluid control valve 68 having an actuator 70 and operatively communicating with a suitable fluid supply line 71. Of course, the fluid motor 40 is illustrated herein as comprising a pneumatic motor but it may also be in the form of a hydraulic motor or cylinder.

A tire casing retaining hook 72 including a pair of downwardly divergent arms 74 and 76 interconnected at their upper end portions by means of a bight portion 78 is provided and the arm 74 thereof is provided with a plurality of longitudinally spaced apertures 80. The arm 74 is pivotally supported between the upper ends of the angle members 28 by means of a pivot fastener 82 secured through the angle members 28 in a selected one of the apertures 80 with a pair of spacing sleeves 84 being disposed on the pivot fastener 82 between the arm 74 and the angle members 28. The free end of the arm 76 includes a laterally enlarged head portion 86 for engagement with a side of a tire casing supported from the rollers 32 remote from the angle members 28.

Secured to the ends of the members 14 and 16 remote from the member 18 are a pair of upwardly inclined support arms 90 between which a pair of hooked arms 92 are pivotally supported by means of a pivot pin 94. The pivot pin 94 has one externally threaded end portion 96 with which an adjusting nut 98 is threadedly engaged and the nut 98 has a crank arm 100 secured thereto whereby the hooked arms 92 may be readily frictionally retained in adjusted rotated position.

With attention now directed more specifically to FIGURE 7 of the drawings there may be seen a tire bead spreading assembly generally referred to by the reference numeral 104 including a first pair of links 106 provided with longitudinally spaced apertures 108. The links 106 are pivotally supported from the members 14 and 16 by means of a pivot fastener 109 secured through the members 14 and 16 and one pair of corresponding apertures 108. In addition, one pair of corresponding ends of the links 106 are pivotally secured to a second pair of links 110 by means of pivot fasteners 112 secured through the links 104 and selected longitudinally spaced apertures 114 in the links 110. The links 110 are interconnected at one pair of corresponding ends by means of a transverse rod 116 and the same pair of corresponding ends of the links 110 include hooked arms 118 similar to the hooked arms 92.

Also, an anchor plate 120 is pivotally secured between the links 106 by means of a pivot fastener 122 secured through a second pair of selected apertures 108 in the links 106 having a sleeve 124 journalled thereon between the links 106 and secured to one end of the anchor plate 120. The other end of the anchor plate 120 has a section of link chain 126 secured thereto at one end and the other end portion of the link chain 126 is selectively engageable in a notch 128 formed in a pressure foot 130 secured to the free end of the piston rod portion 44.

In operation, a tire casing 132 mounted on a wheel rim 134 is disposed on the rollers 32 and is thereby rollingly supported from the frame 12. The hook 72 is thereafter swung over the top of the casing 132 so as to maintain the casing 132 in an upright position against the abutment surfaces defined by the flanges 38. Thereafter, the screw shaft 60 may be rotated so as to properly adjust the height of the pressure foot 130 for engagement with the adjacent side wall 136 of the casing 132 immediately adjacent the lower periphery of the wheel rim 134. Then, the fluid motor 40 may be actuated to extend the piston rod portion 44 whereby the lower portion of the side wall 136 will be inwardly deflected thus "breaking" the corresponding bead portion of the casing 132 from the associated portion of the wheel rim 134. Thereafter, the piston rod portion 44 of the fluid motor 40 may be retracted and the tire casing 132 may be reversed in position on the frame 12 and have its opposite bead portion "broken" from the corresponding rim flange of the wheel rim 134.

Further, after the tire casing 132 has been removed from the wheel rim 134, it may be rollingly supported from the rollers 34 and the hooked arms 92 and 118 may be hooked over corresponding bead portions of the casing 134. Thereafter, the chain 126 may be suitably engaged with the notch 128 in the pressure foot 130 and the piston rod portion 44 may be retracted so as to spread the bead portions engaged by the hooked arms 92 and 118 to be spread apart. Of course, the tire casing 132 may be rotated in position on the rollers 34 so as to have different portions of the bead portions thereof spread apart.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents maybe resorted to, falling within the scope of the invention as claimed.

What is claimed as new is as follows:

1. A tire breaking machine comprising frame means to support a wheel mounted tire and defining abutment surface means against which one side of said wheel mounted tire is to abut to prevent lateral movement of said tire in the direction in which said one side faces, a longitudinally extendible motor having one end portion pivotally supported from said frame means for rotation about an axis generally paralleling said abutment surface means with the other end portion of said motor extending toward said abutment surface means, including means on its free end for engagement with the opposing side wall portion of said tire, said motor including means for mounting it for swinging in a plane disposed generally normal to said abutment surface means and generally along a radius of a wheel disposed against said abutment surface means, and adjustable means connected between said frame means and said extendable motor operative to adjustably angularly position said motor relative to said frame means.

2. The combination of claim 1 wherein said fram means includes means to rotatably support said tire therefrom in a manner such that said tire may be readily rotated about its center axis while maintaining said center axis stationarily positioned relative to said abutment surface means.

3. The combination of claim 1 wherein said frame means also includes means operative to rotatably support a tire casing therefrom permitting said tire casing to be readily rotated about its center axis while maintaining said center axis stationarily positioned relative to said frame means and in generally parallelism with the longitudinal axis of said motor and with said tire casing spaced at least slightly outwardly of said free end of said motor, said motor being of the double-acting type, said frame means including means to engage and anchor the bead portion of said casing remote from said motor, said means on the free end of said motor being connectable with the opposing bead portion of said casing whereby said bead portions may be spread apart upon retraction of said motor.

4. The combination of claim 1 wherein said frame means includes means to rotatably support said tire therefrom permitting said tire to be readily rotated about its center axis while maintaining said center axis stationarily positioned relative to said abutment surface means, said frame means also including second casing supporting means operative to rotatably support a tire casing therefrom permitting said tire casing to be readily rotated about its center axis while maintaining said center axis stationarily positioned relative to said frame means and in generally parallelism with the longitudinal axis of said motor and with said tire casing spaced at least slightly outwardly of said free end of said motor, said motor being of the double-acting type, said frame means including means to engage and anchor the bead portion of said casing remote from said motor, said means on the free end of said motor being connectable with the opposing bead portion of said casing whereby said bead portions may be spread apart upon retraction of said motor.

5. The combination of claim 1 wherein said abutment surface means defined by said frame means is disposed in an upstanding plane disposed generally normal to the longitudinal axis of said motor.

6. The combination of claim 5 wherein said means to support a wheel mounted tire comprising a pair of support rollers journalled from said frame means in side-by-side relation for rotation about axes disposed generally normal to said plane.

7. The combination of claim 6 wherein said frame means also includes means operative to rotatably support a tire casing therefrom permitting said tire casing to be readily rotated about its center axis while maintaining said center axis stationarily positioned relative to said frame means and in generally parallelism with the longitudinal axis of said motor and with said tire casing spaced at least slightly outwardly of said free end of said motor, said motor being of the double-acting type, said frame means including means to engage and anchor the bead portion of said casing remote from said motor, said means on the free end of said motor being connectable with the opposing bead portion of said casing whereby said bead portions may be spread apart upon retraction of said motor.

8. The combination of claim 7 wherein said abutment surface means defined by said frame means is disposed in an upstanding plane disposed generally normal to the longitudinal axis of said motor.

9. The combination of claim 8 wherein said means to support a wheel mounted tire comprising a pair of support rollers journalled from said frame means in side-by-side relation for rotation about axes disposed generally normal to said plane.

10. The combination of claim 1 wherein said adjustment means includes a threaded connection between said other end portion of said motor and said frame means.

11. A tire breaking machine comprising frame means defining abutment surface means adapted to have one side of a wheel mounted tire abutted thereagainst, force means including a movable portion thereof drivable toward and away from said surface means and disposed generally normal to said abutment surface means, to abut and inwardly deflect the bead portion of said tire, and including means to have one end of a pull member attached thereto, a pull member having one end releasably attachable to said portion of said force means, said frame means including means to support a dismounted tire casing in position with its medial plane disposed generally normal to said path and with said casing supported for guided rotation about its center axis and spaced from said movable portion of said force means, said frame further including first means to engage and axially outwardly displace the bead portion of a dismounted tire casing remote from said force means movable portion and second means to engage a corresponding portion of the bead portion of said casing adjacent said force means movable portion, said first and second means being supported in generally stationary positions relative to said frame means and engageable with said bead portions for rotation of said casing relative to said first and second means while said bead portions are spread apart, and means operatively connecting the other end of said pull member to said second means for movement of the latter with said movable portion of said force means away from said casing so as to spread said bead portions, whereby said movable portion of said force means may alternately be used to first unseat the bead portions of a tire casing from the associated wheel rim and then to spread the bead portions of the tire casing after it has been dismounted from the wheel rim while the tire casing is being rotated about its center axis for inspection of the inner surfaces of the tire casing.

12. The combination of claim 11 wherein said movable portion of said force means is supported for movement from said frame means for lateral adjustment of the path of movement of said movable portion of the force means relative to the abutment surface means.

References Cited
UNITED STATES PATENTS

| | | | |
|---|---|---|---|
| 2,631,817 | 3/1953 | Trunnell | 254—50.4 |
| 2,749,975 | 6/1956 | Curtis | 157—1.26 |
| 3,033,268 | 5/1962 | Schaevitz | 157—1.26 |
| 3,142,330 | 7/1964 | Nelson | 157—1.17 |
| 3,295,828 | 1/1967 | Stout et al. | 254—50.5 |

MILTON S. MEHR, *Primary Examiner.*